United States Patent [19]

Sala

[11] 4,280,361
[45] Jul. 28, 1981

[54] DEVICE FOR DETECTING THE DEFROSTING OF FROZEN PRODUCTS

[75] Inventor: Franco Sala, Via Milani 3/A, Milan, Italy

[73] Assignee: Franco Sala, Milan, Italy

[21] Appl. No.: 92,616

[22] Filed: Nov. 8, 1979

[30] Foreign Application Priority Data

Jun. 8, 1979 [IT] Italy .............................. 23388 A/79
Jul. 4, 1979 [IT] Italy .............................. 24091 A/79

[51] Int. Cl.³ ........................................... G01K 11/12
[52] U.S. Cl. .................................... 73/356; 116/219
[58] Field of Search .................. 73/356; 116/219, 217; 426/88

[56] References Cited

U.S. PATENT DOCUMENTS

| 2,716,065 | 8/1955 | Beckett et al. | 73/356 |
| 3,177,843 | 4/1965 | Geocaris | 116/219 |
| 3,312,079 | 4/1967 | Siebert | 73/356 |
| 3,702,077 | 11/1972 | Szabo | 73/356 |
| 3,958,528 | 5/1976 | Hill | 116/219 |
| 3,967,579 | 7/1976 | Seiter | 73/356 |
| 4,022,149 | 5/1977 | Berger | 73/356 |
| 4,144,834 | 3/1979 | Donegan | 116/219 |
| 4,145,918 | 3/1979 | Couch et al. | 116/219 |
| 4,191,125 | 3/1980 | Johnson | 116/219 |

Primary Examiner—Donald O. Woodiel
Attorney, Agent, or Firm—Ladas & Parry

[57] ABSTRACT

A process for detecting and signaling the defrosting, even temporary, of frozen products which consist in providing a detecting device consisting of a closed container having therein a colorless and a colored element which, under frozen conditions, are separate from each other but will admix and form a single colored mixture on defrosting. The presence of said single mixture indicates that defrosting has taken place. The device is also disclosed and claimed.

12 Claims, 15 Drawing Figures

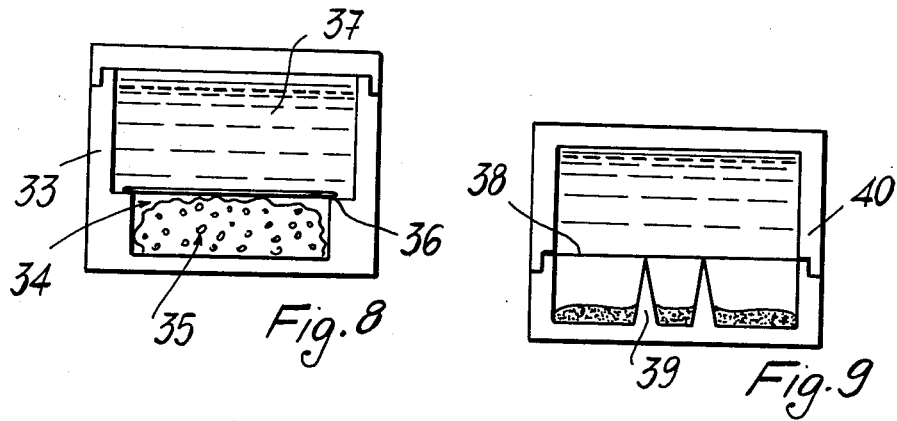
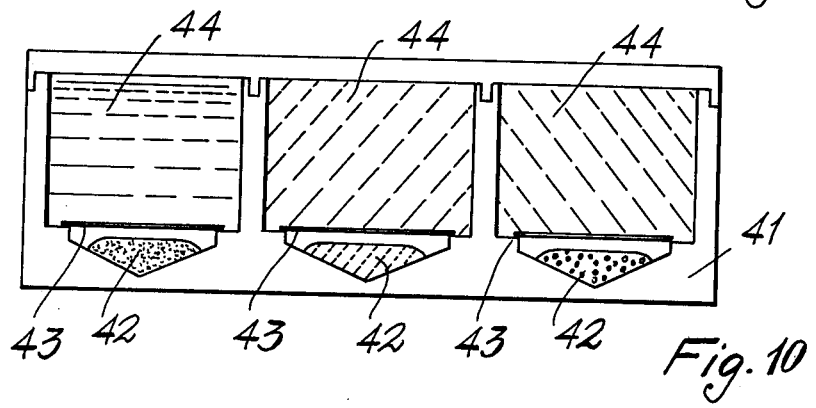
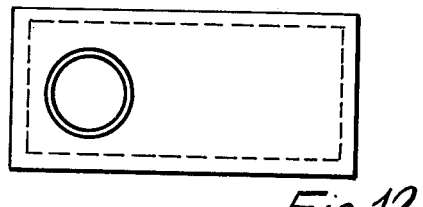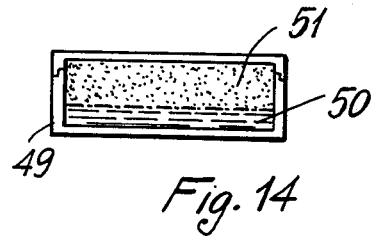
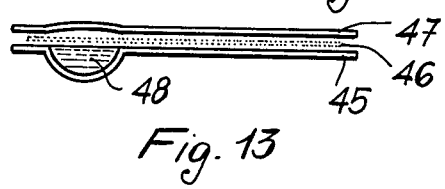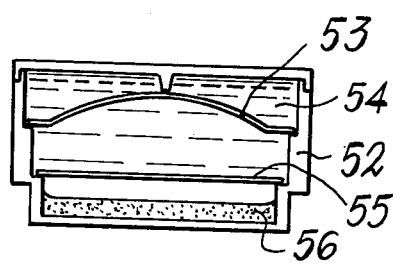

DEVICE FOR DETECTING THE DEFROSTING OF FROZEN PRODUCTS

The present invention relates to a process for detecting and signaling the eventual defrosting, even temporary, of frozen products, process in which there is utilized the variation of volume of a liquid or of a solution during the freezing cycle, to permit the activation of an indicating device which had previously been kept separate (and not detected).

Many products, for example, in the food, chemical and pharmaceutical fields, must be stored at a low temperature. The inconvenience, sometimes serious, caused by an eventual defrosting, even accidental or temporary, of said products are well known.

A possible defrosting, even temporary, for example, of frozen foods may damage said products or may modify their characteristics without the consumer becoming aware of said fact, since the exterior appearance, if the product is subsequently refrozen, remains practically unchanged.

This, particularly in the case of frozen foods, the consumption of which is continuously expanding, if one of the reason of the diffidence of the public with respect to this type of product, distribution which tends to hamper the diffusion thereof.

If, in addition to said inconvenience, one considers the eventual consequences which could result from the use of frozen products not suitably stored, such as food products which may have become altered or damaged, the utility of a method and of a device for detecting the eventual defrosting of the frozen product is easy to understand.

An additional problem to resolve is the fact that said devices must be inexpensive so that they may be used in conjunction with products of relatively low cost without excessively increasing said base coat and which must also be able to furnish a signal which anyone can detect.

Considering now the general freezing diagram of an aqueous solution (FIG. 11), it can be seen that, taking an aqueous solution with a weight percentage of a salt, of an element or of a compound such as, for example NaCl, KCl, NH$_4$Cl, which percentage is indicated with $C_b$, with the lowering of the temperature from $t_a$ to $t_b$, the solution does not freeze up to the point B. Once the point B is reached, if the out-side temperature is lower than $t_e$, from the solution there begins to separate some ice, which effect thus causes an increase in the concentration of the solution. The solution moves on the curve B–E, with a resulting continuing separation of ice and increase in the concentration. Once the temperature reaches $t_e$, all the water has separated (becoming ice) and the salt crystallizes, thus obtaining a solid eutectic.

The basic concept is a method in which, utilizing the aforementioned characteristics, the combination of aqueous solutions of the type described above with a coloring agent or with a solution thereof it is foreseen, so as to exploit the said increase in volume to cause the opening of a communication conduit between said two products, the opening of said communication conduit taking place only and exclusively when the two products are in condition of not being admixable with each other. Obviously, any rise in temperature, accidental or not, determines the defrosting of one of the two products or of both so that there takes place, through said communication conduit, an admixing which is irreversible and which is independent from any subsequent temperature lowering. An essential characteristic of this embodiment is that to have a product which is non-miscible in any physical condition up to the point of freezing.

Before the freezing cycle, between the solution and the coloring agent, there is interposed a diaphragm of break-able material which prevents the contact between the two components. During the freezing cycle, the diaphragm is broken or displaced by the effect of the increase of the volume of the water which separates from the crystals of the dissolved salt, but there does not take place an admixture due to the solid state in which the solution itself.

When the temperature is temporarily higher than the eutectic point (which, as well as the defrosting speed, can be predetermined for the different temperatures with suitable solutions) there is obtained the ad-mixture of the solution with the coloring agent so that in the following freezing cycle it maintains the color which it had assumed, during the defrosting cycle.

According to a preferred embodiment of the process according to the present invention, the two products are initially kept separate, on the inside of a non-deformable container, by a septum which is breakable by the aforesaid increase in volume. According to a possible variation, the septum interposed between the products become porous (this permits the passage of one of the two liquid products toward the other in function of the increase in volume and thus of the increase in pressure). According to another variation of the invention, there is provided only the aqueous solution with a breakable diaphragm section against which there acts an indicating element activated by means elastic against the said diaphragm so that, once the diaphragm is broken, in the case of defrosting the indicating element becomes visible from the outside.

According to another variation of the invention, there is provided only the aqueous solution with the breakable diaphragm, there being provided absorbent means which will become colored, once the break takes place in the case of defrosting, said coloration being irreversible and visible from the outside. It is to be noted that, where in the present case it is referred to a breakable diaphragm, it is to be understood that it refers, to any means which, under the action determined by the increase in volume of the solution, breaks by reason of the fragility caused by the indicated temperature, it tears, it is pierced or it is pushed out of its seat. Referring now again to FIG. 11, which represents the various phases of a water-salt solution in a diagram in which on the abscissa there is reported the concentration and on the ordinate the temperature, there is indicated with E the eutectic point, with $t_e$ and $C_e$ the corresponding values of temperature and concentration, with $t_a$ a temperature higher than 0 degrees, with $t_b$ and $t_i$ two temperatures comprised between 0 and $t_e$ and with $C_b$ and $C_i$ the concentration values corresponding to the temperatures $t_b$ and $t_i$.

As indicated in the graph, according to the conditions of concentration and temperature, there can be obtained a liquid solution, a combination of solution plus salt or solution plus ice, salt plus solid eutectic mixture or ice plus solid eutectic mixture. At the point E there may coexist at the same time the three phases.

Considering now a device according to the invention in which the aqueous solution has a concentration $C_b$, with the lowering of the temperature from a general value $t_a$ to a value $t_b$, up to the point B the solution does not freeze. Arriving at point B, as long as the outside temperature remains higher than the value $t_e$, from the solution there begins to separate ice, while the concentration increases. The solution moves along the line B–E continuing to separate ice while the value of the concentration increases. When the temperature arrives at the value $t_e$, all the water is separated and has become ice, and the salt crystallizes. The increase in volume of the water thus determines the breaking or the displacement of the diaphragm of the device. The starting concentration of the solution, together with its volume, is important for determining the time of defrosting and thus of coloration.

If, all other conditions being equal, there are taken two solutions with concentrations $C_b$ and $C_e$, during the defrosting phase that having a lower concentration ($C_b$) becomes colored in a different manner with respect to the solution having a higher concentration ($C_e$). If in fact the two systems are brought to a temperature $t_i$ slightly higher than the temperature of the eutectic point $t_e$, the solution $C_e$ becomes completely liquefied while the solution $C_b$ still maintains the central nucleus of ice, since a small quantity of water is sufficient for dissolving the salt at the equilibrium concentration $C_i$. There will thus first take place the liquefaction of the outer crown of ice. If the crown assumes a dimension such as to come in contact with the coloring agent, there will take place a slow diffusion of the coloring agent in the solution-ice mixture. If the eventual successive refreezing takes place before the complete diffusion of the coloring agent, the crown previously colored will maintain the coloration it has acquired.

By selecting different types of aqueous solutions, it is thus possible to obtain different eutectic points, and, by selecting different concentrations, it is thus possible, for the same temperature of the eutectic point, to determine different defrosting speeds.

The present invention, in the light of the theory mentioned above, relates to a process for detecting and signaling the eventual defrosting, even temporary, of products, utilizing the said variation in volume of a liquid or of an aqueous solution during the freezing cycle to place in communication said liquid or solution with indicating means which had previously been kept separate by means removable in function of said variation in volume.

The object of the present invention is a process in which said liquid or solution on one side and said indicating means on the other are placed in contact under physical conditions (freezing) such as not to permit an interaction between each other, said interaction made possible in an irreversible manner only by a variation of their physical conditions (defrosting).

The invention also relates to devices for carrying out the latter process.

The present invention, and in particular the devices for effecting said process, will now be described in detail, solely by way of non-limitative example, with particular reference to the attached figures in which:

FIG. 8 represents the section of a device according to the present invention in which the indicating element consist of an expandable hygroscopic material;

FIG. 9 represents the section of a device according to the present invention with a deformable and tearable separation diaphragm;

FIG. 10 represents the section of more devices according to the present invention, connected between each other and calibrated for the different defrosting temperatures;

FIG. 12 represents the view from above of a device according to the invention in which the coloring solution is in direct contact with the element to be colored;

FIG. 13 is a section of the device of FIG. 12; and

FIG. 14 is a section of a device according to the present invention in which the two solutions are in direct contact;

FIG. 15 is a section of an additional variation of a device according to the invention.

Figure 1:
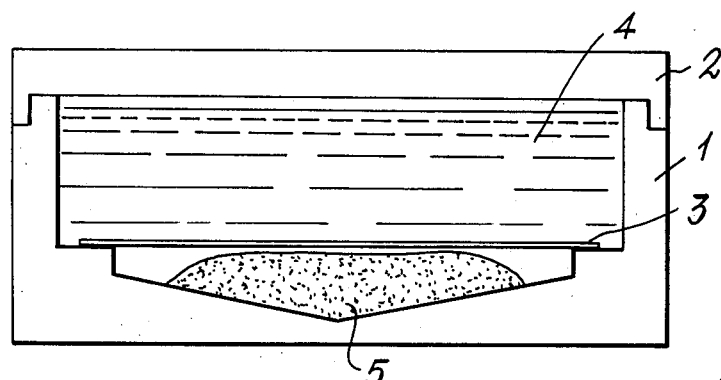
FIG. 1 represents the section of a device according to the invention with a rigid container and containing the solutions separated by a breakable septum.

With reference to FIG. 1, an aqueous solution 4, of a suitable concentration, is enclosed in a rigid container 1 of a material resistant to the low temperatures and preferably non-deformable and transparent. An example of such material may be polystyrene of the crystalline type.

A cover 2, also preferably of a transparent material, closes hermetically the container 1. The aqueous solution is separated by a wall of breakable thin material 3, preferably a foil of glass film (breakable septum), from a solution containing a coloring agent, indicated with 5.

Obviously the devices according to the invention may have different forms and dimensions in function of the particular applications.

Said devices may then be directly incorporated into the wrapper of the package or may be directly attached to or sealed on to it in any known manner. The aqueous solution occupies all the space at its disposal, and the different possible concentrations and its thicknesses determine the different defrosting speeds for which it is desired to calibrate the device.

On the other hand the coloring agent, dissolved in a suitable solvent, such as for example erythrocine, does not occupy completely all the space at its disposal but leaves room for the increase in volume of the aqueous solutions which, contained in a rigid container, during the freezing cycle, because of the increase in volume, pushes against the diaphragm 3, breaking it and thus coming in contact with solution 5, without, however, becoming admixed with it since both solutions are frozen.

In the case of defrosting the two solutions mix irreversibly and, from the resulting coloration of the solution 4 which was previously colorless, there can be detected the fact that defrosting has occurred, even after a subsequent refreezing. From the degree of diffusion of the coloring dimensions of the colored crown, there can then be estimated the degree of defrosting which has taken place.

Figure 2:
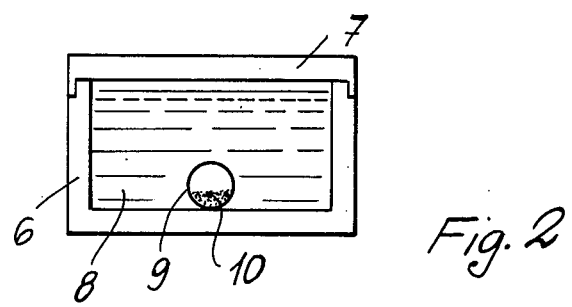
FIG. 2 represents the section of a device according to the invention with the same rigid container and with the coloring agents contained in a partially filled breakable sphere.

A variation of the device according to the invention is shown in FIG. 2.

It consist of a rigid container 5 closed hermetically by a cover 7 and containing the aqueous solution 8. The coloring agent 10, in powder or crystal form, is enclosed in a breakable capsule 9 which is broken by the solution 8 while it freezes. In this case, said breakable section consists of the breakable capsule 9. In the case of defrosting, the coloring agent dissolves in the solution, coloring it.

Figure 3:
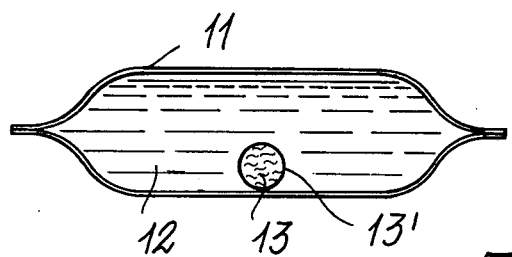
FIG. 3 represents the section of a device according to the invention with a deformable container and with the coloring solution contained in a completely filled breakable sphere.

In FIG. 3 there is represented another variation of the device according to the invention which consists of a container 11, of a deformable material, full of an aqueous solution 12, suitably concentrated. The coloring agent 13, with the same eutectic point of the solution 12, is contained in a breakable capsule nucleus 13. Also in this case the breakable septum is formed by the capsule. The increase in volume of the aqueous solution is absorbed by the deformation of container 11, while the expansion of the colored solution breaks the walls of the capsule nucleus.

Figure 4:
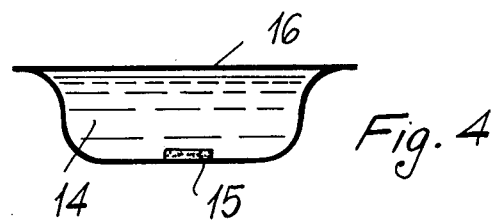
FIG. 4 represents the section of a device according to the invention with a flexible container and with the coloring agent enclosed within a resin nucleus.

An additional variation is shown in FIG. 4.

In it, a flexible container 16 is filled with the aqueous solution 14. The coloring agent is mixed with a nucleus of resin 15, of a suitable type, before the solidification. During the freezing cycle the resin breaks into particles, putting into contact with the solution the coloring particles which will then dissolve in th-e case of possible defrosting.

Figure 5:
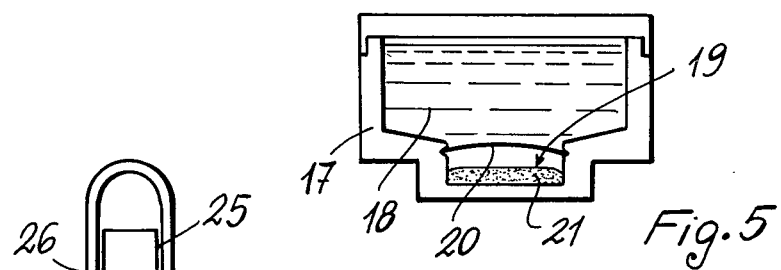
FIG. 5 represents the section of a device according to the invention with a rigid container and with the coloring solution contained in a well closed by means of a pressure diaphragm.

FIG. 5 shows an additional variation of a device according to the invention.

In it the container consists of a capsule 17 of rigid material, filled by the solution 18 and provided with a well 19 with a hole closed by a pressure diaphragm 20.

During the freezing solution 18, by expanding, displaces the diaphragm, causing its exit from its seat and permitting, during a subsequent defrosting, the admixture with the coloring agent contained in the well.

Clearly, by filling completely the well 19 and leaving a portion of free space above the diaphragm 20, the latter could be displaced by the expansion of the colored solution.

Figure 6:
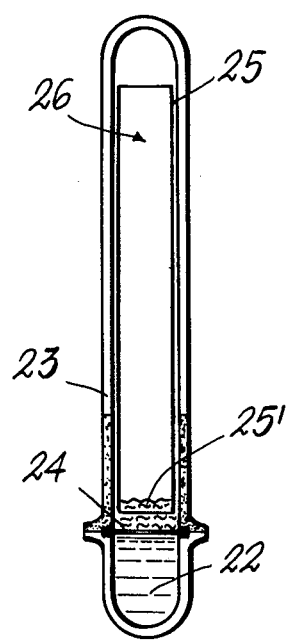
FIG. 6 represents the section of a device according to the present invention in which a breakable diaphragm separates a chamber completely filled by the coloring solution from an empty chamber lined with an adsorbed material.

An additional version is shown in FIG. 6 and provides the utilization of a colored solution 22, separated by means of a breakable diaphragm 24 from an empty chamber 26 of a container 23. On the bottom of the chamber 26, in contact with the diaphragm 24, there is found a layer of absorbent material 25' also in contact with a layer of absorbent paper 25 disposed along the internal walls of the chamber 26.

Figure 7:
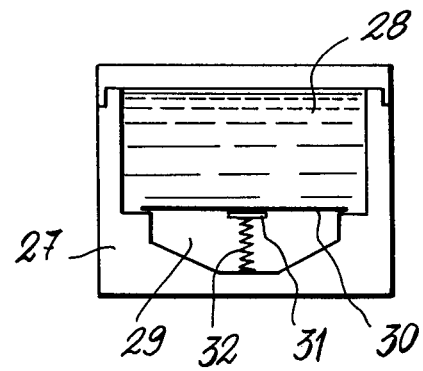
FIG. 7 represents the section of a device according to the invention in which the indicating means consist of a colored element operated by elastic thrust means.
Figure 11:
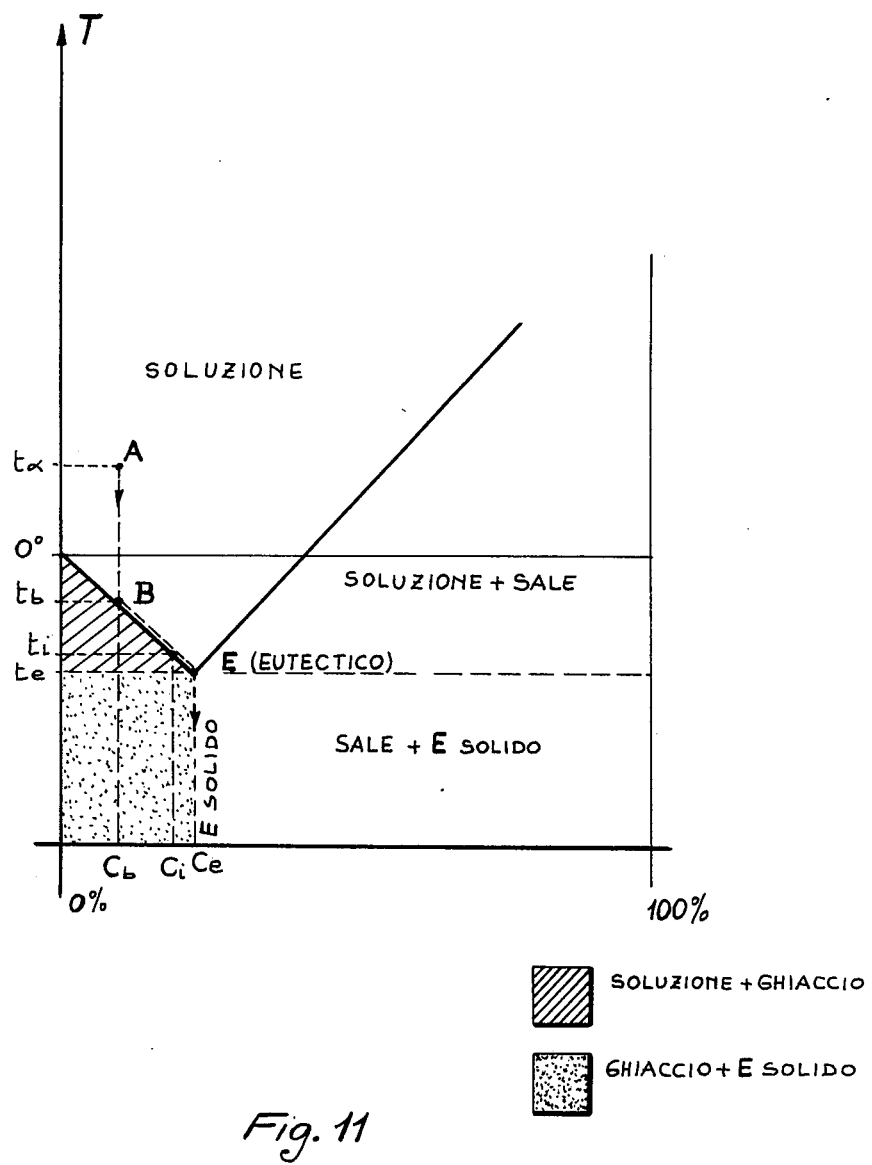
FIG. 11 represents the phase diagram of a water-salt solution.

During the freezing phase, the diaphragm 24 is broken by pressure of the solution 22 which, in the case of defrosting, passing through the ab-sorbent material 25', will be absorbed by the absorbent paper 25 which will remain indelibly colored. FIG. 7 represents an additional variation in which the indicating element consists of a mechanical means. The rigid container 27, containing the aqueous solution 28, is provided with a well 29 closed by a breakable wall (breakable septum) 30.

At the inside of the well there is present a colored element 31 fixed onto an elastic thrust element 32.

When the solution 28, on freezing, breaks the wall 30, it opens the way to the element 31 which, in the case of defrosting, exits from the well, becoming visible on the surface.

An additional version of the device (FIG. 8) provides a rigid container 31 provided with a well 34 containing hygroscopic material 35 and separated by means of the breakable section 36 from the solution 37.

The solution 37, on freezing, breaks the wall 36 and, during the defrosting cycle, the hygroscopic element 35, characterized by a strong increase in volume when it comes in contact with a liquid, exits from the well, becoming visible.

According to an additional variation (FIG. 9), the separation wall 38 (breakable septum) may be of a deformable material, suitably stretched, in contact with pointed elements 39, dividing the container 40 into two compartments.

When the solution, present in the upper compartment, freezes, its increase in volume presses the wall 38 against the elements 39, tearing it.

After which the solution, in case of defrosting, can mix with the coloring agent present in the lower compartment, becoming colored.

In all of the preceding description, there has been described and illustrated single devices for carrying out the process of the present invention and, for each of them, it has been noted that, as a function of different aqueous solutions, it is possible to calibrate them for a predetermined temperature (for example, the limit temperature for a particular product). It is however evident that, for particular applications, there may be combined two or more devices of any of the types described, each with its particular solution different from that of the others, so as to be able to detect up to what point has arrived the defrosting phase.

One such version of the device (FIG. 10) provides the outer envelope or container 41 subdivided into one or more independent compartments, each with its own nucleus of coloring agent 42 separated by a foil 43 (breakable septum) from the solution 44. Each compartment contains solutions having different eutectic points so that the coloring agent, which may be different in each compartments, may signal the different degrees of defrosting or the permanence at too high a temperature for different times.

As has already been indicated, the solutions described represent in very numerous cases optimal solutions since the devices may be constructed, commercialized, stored and inserted into the final package of the products to be frozen without any particular precaution, since the contacting of the two components, which can result in the visual detection, takes place only during the freezing phase.

However, according to the invention, there is foreseen the possibility of placing into direct contact the two components when they, or at least one of them, are already frozen; this requires on the one hand particular preliminary precautions with respect to the packaging, but permits, on the other hand, to save on the construction of the device itself (for example, since the presence of the breakable septum is no longer necessary). This form of realization of the inventions is illustrated by the devices shown in FIGS. 12, 13 and 14, which represent two devices according to the invention, in which there is not utilized the breakable septum and the solutions, previously cooled to a temperature lower than the eutectic point, are brought into direct contact.

FIGS. 12 and 13 represent a view from above and a sectional view of a device according to the invention, in which the container is formed by two flat sheets 45 and 47, of a rectangular shape, but which can be of any shape, superimposed and sealed along the edges. In one of the two sheet there is provided a depression which forms a cup containing the solidified coloring agent 48.

Between the two plates there is disposed a layer of absorbent paper 46. As long as the temperature is kept below that of selected entectic point, the coloring agent remains in the solid state while, in the case of defrosting, it dissolves, spreading itself on the absorbent paper which thus remains colored.

FIG. 14 represents a variation of the device consisting of a transparent container 49, in which there are placed in direct contact, after they have been solidified at a temperature below the eutectic point, a colorless solution and a colored solution.

When the temperature goes up and the two solutions liquefy, there begins the diffusion which colors indelibly the solutions which was previously colorless.

To better permit one skilled in the art to understand the physico-chemical characteristics of the devices for carrying out the invention, there now follows and example relating to a practical experiment carried out by the applicant and summarized in the following example.

EXAMPLE

The pilot experiment was carried out both with isolated devices and in operative conditions, i.e., those reproducing the real conditions of application to products requiring storage at low temperatures. As products tested there have been chosen the frozen foods. There have been determined:
(1) resistance of the polystyrene container to the limit temperatures of application;
(2) resistance of the walls of the container to the expansion of the frozen solutions;
(3) times of freezing and crystallization;
(4) times of defrosting at different temperatures; and
(5) times of diffusion of the coloring agent at different temperatures.

Technical characteristics of the device

The containers are formed by polystyrene capsules in discoidal form of the following dimensions;
internal diameter: 31.5 mm
external diameter: 35.5 mm
internal height: 4.0 mm
external height: 7.0 mm
thickness of the walls: 1.5 mm The bottom of the capsule is formed from white opaque polystyrene while the cover is transparent.

On the bottom there is present a circular hole having a diameter of 17 mm, or a square hole with 17 mm sides, to which there is sealed, by means of a self-leveling silicone gum sealant, for example, of the type known in commerce with the trademark Silastic 734 RTV, a diaphragm of glass film of a thickness of 0.16 mm, of square shape, whith sides of 24 mm. The sealant is allowed to vulcanize for at least 24 hours before the capsule is filled with the saline solution. On the outer side of the bottom of the capsule there is sealed a polystyrene cup having a diameter of 25 mm and a height of 3 mm, containing the colorant solution (about 0.7 cc). The capsule is filled with and aqueous solution having a known eutectic point.

Under the cover of same of the capsules, in contact with the aqueous solution, there is sealed a disk of blotting paper of high absorbency (there was used the paper "Omnia-filter supervelox" of the Cartiera del Torano, Naples), which obstructs the view of the diaphragm and of the cup of coloring agent and, on defrosting, gives a uniform coloration of the capsule. For the pilot experiment in question there was further chosen an aqueous solution containing 19.7% by weight of $NH_4Cl$ with a eutectic point of $-15.7°$ C. As solvent there was used distilled water to guarantee the reproducibility of the experiments. As coloring agents there were used alcoholic solutions of Eosine G or of Erythrocine at 2% concentration (in denatured alcohol at 26.5% whith a freezing point at $-12.2°$ C.).

Refrigerant means

The freezing apparatus consisted of a 10 liter container, with double walls, in polyester resin, insulated with foamed polyurethane as interspace. The sealing cover is a double sheet of crystal which permits the visual following of the freezing phases. The freezing apparatus contains initially 7 Kg of dry ice which supplies a temperature comprised between $-55°$ and $-65°$ C. for at least 12 hours.

There have also been utilized four Dewar cylinders of the capacity of ½ liter each, insulated within foamed polystyrene envelopes and having sealing covers provided with a thermometer $(-70°/+50°$ C.). In each Dewar there is placed an aluminum cup of 200 cc capacity, containing an aqueous solution solidified at $-55°$ C.

The solutions used in the four cylinders were:
(a) NaCl 23.3% with a eutectic point of $-21.1°$ C.
(b) $NH_4Cl$ 19.7% with a eutectic point of $-15.4°$ C.
(c) KCl 19.7% with a eutectic point of $-10.7°$ C.
(d) $MgSO_4$ 16% with a eutectic point of $-4°$ C.

Since the eutectic solutions store refrigeration units in the form of latent heat of solidification, and this reserve of cold, accumulated during the freezing cycle, is returned during the melting cycle, they determine in the Dewar cylinders temperatures corresponding to, or very near, the eutectic points indicated for at least 4 hours. To further favor the maintaining of the necessary temperatures, over every cup there is placed another cup, upside down, and in the space between the two there are laid the capsules or the frozen food packages.

Scheme of the experiment and results

| 55° C. for 4 hours | 21.1° C. for 3 hours<br>15.4° C. for 3 hours<br>10.7° C.<br>4.0° C.<br>0.0.° C.<br>ambient temperature (20° C.) |
|---|---|

The solidification and crystallization of the solution, both in the isolated capsules and in the frozen food packages, takes place within 1 hour and 30'. This time is not influenced by whether the frozen food products were already frozen or if they were defrosted before the beginning of the experiment.

At the temperatures of −21.1° C. and −15.4° C., lower or equal to the eutectic point of the solution used, in the capsule there does not verify any phenomenom and the solutions remain solid. At −10.7° C. in the isolated capsules the beginning of the defrosting cycle, emphasized by the appearance of a translucent halo at the periphery of the capsule, takes place within 30' and the melting is complete within 1 and one half hour. In the frozen food packages the beginning of the defrosting cycle takes place after about 40' and the operation is completed within 1 hour and 40'. At −4° C. the melting begins within 25' and is complete within 1 hour and 15', both in the isolated capsule and in the frozen food packages.

At 0° C. the beginning of the defrosting cycle takes place after 20' for the isolated capsules, after more than 30' in the packages. The complete melting of the solutions takes place for the isolated capsules within one hour while for the capsule in the boxes of frozen foods within one hour and 40'.

Finally, at ambient temperature the beginning of the defrosting is rapid in the isolated capsules (10') and is concluded within 20' while for the packaged products begins within 30' and is concluded within 1 hour.

It is necessary to underline the fact that the experiment with the frozen food products is purely indicative, since the use of different frozen produts, each with its own thermic inertia, affects differently the times indicated. For the experiment described there were used boxes containing 2 hamburgers of 150 g each, which have furnished the data set forth above, as well as boxes containing spinach and fish sticks, for which the times have been substantially different (longer for the spinach, shorter for the fish sticks). As regards the diffusion of the coloring agent, in the isolated capsules, it takes place at an even rate with the defrosting of the saline solution, even if the manner in which the diaphragm has broken may have same effect thereon. In fact, if the break is central, there remains at this point some ice which may prevent almost up to the end of the defrosting cycle the contact between the saline solution and the coloring agent.

In the capsules contained in the frozen foods, the beginning of the diffusion is delayed since the coloring agent, in contact with the frozen food, remains in the solid state longer than the saline solution. In any case, when the latter is completely liquid, the diffusion takes place showly to be there favored by the subsequent liquefaction of the coloring agent.

For the isolated capsules, at every temperature tested, the diffusion of the coloing agent begins not later than 35-40' after the beginning of the defrosting and the complete coloration of the absorbent paper takes place within 30' from the end of the melting. The intensity of the color gradually increases as time goes on.

For the capsules in the frozen food packages, as previously indicated, the defrosting time is slower due to the thermal inertia of the product contained in the package, and it is even more so if it is in contact with the capsule of the indicator. The diffusion of the coloring agent then follows the complete defrosting of said coloring solution, which can happen even after the complete melting of the saline solution. The times recorded, then, are only indicative and it can be indicated that, on the whole, the complete coloration of the detector can take place between 30' and one hour from the end of the defrosting. The coloration of the absorbent paper follows the pattern described for the isolated capsule.

Finally, as regards the resistance of the walls of the container both to the low temperatures and to the pressure caused by the expansion of the frozen solution, it was found to be excellent.

FIG. 15 shows an additional variation of a device according to the invention.

The aqueous solution 54 in the rigid container 52 contains a colored element 53.

In a well on the bottom of the container 52 there is an element 56 which, when it comes into contact with the aqueous solution, lowers the eutectic point of said solution.

In this way the solution, when freezing, hides the colored element and breaks the breakable septum 55.

In case of defrosting the element 56 is mixed with the aqueous solution lowering in this way the eutectic point thereof so that the solution remains liquid, thus permitting the colored element to be detected.

The aqueous solution wholly surrounds the colored mechanical element 53 and No. 54, which appears twice in the drawing, indicates the solution both below and above element 53.

What is claimed is:

1. A device for detecting the defrosting of frozen products, which comprises a rigid container, on the inside of which there are two solutions, one at least aqueous and saline and another one at least colored, separated by a septum breakable at the moment of freezing, said container being wholly filled with one of the solutions in one portion with respect to said septum.

2. A device according to claim 1, wherein there is provided a septum separating the two solutions, which septum is removed mechanically by the increase in volume of one of said solutions at the moment of freezing.

3. A device according to claim 1, wherein said septum perforable by impulse due to the increase in volume, there being provided means capable of producing and supporting laceration of said septum.

4. A device according to claim 1 wherein there is provided a set of several of said rigid containers wherein each of said containers contains different saline solutions so that the degree of the defrosting process which has taken place can be observed.

5. A device for detecting the defrosting of frozen products, which comprises a flexible container containing an aqueous saline solution in which a colored solution is dipped held in a breakable wholly filled container.

6. A device for detecting the defrosting of frozen products, which comprises a container having a colored saline solution, separated from an absorbent material, by a septum breakable at the moment of freezing.

7. A device for detecting the defrosting of frozen products, which comprises a rigid container in which there are two solutions, one at least aqueous and saline and the other colored, separated by a septum breakable at the time of freezing one of which solutions being contained in a breakable unit dipped in the other solution, the entire entity being located in said rigid container entirely filled with one of the two solutions in the portion where volume is to increase during freezing of the solutions with respect to the septum.

8. A device for detecting the defrosting of frozen products, which comprises a container wholly filled with a solution wherein a resin element, that can be disintegrated on freezing, is dipped so that a coloring matter therein contained is liberated.

9. A device for detecting the defrosting of frozen products, which comprises a rigid container having an aqueous saline solution separated by a septum from a detecting element operated by elastic means, said septum being breakable on freezing of said solution.

10. A device for detecting the defrosting of frozen products, which comprises a container containing an aqueous saline solution separated from an expansible hygroscopic body by a septum breakable at the time of freezing.

11. A device for detecting the defrosting of frozen products, which comprises a container consisting of two flat slates welded along their edges and containing a sheet of blotting paper, one of said slates having a cavity containing a previously frozen colored solution, said solution being in touch with the blotting paper.

12. A device for detecting the defrosting of frozen products, which comprises a rigid container in which there is an aqueous saline solution separated by a septum from an element capable of lowering the eutectic point of said solution, said solution containing a colored mechanical indicator element and said septum being breakable at the time of freezing of said solution.

* * * * *